March 1, 1966 W. A. ORLOFF 3,238,373
PHOTOMETRIC GAGE FOR FINDING PERPENDICULARS TO SURFACES
Filed Sept. 26, 1962 2 Sheets-Sheet 1
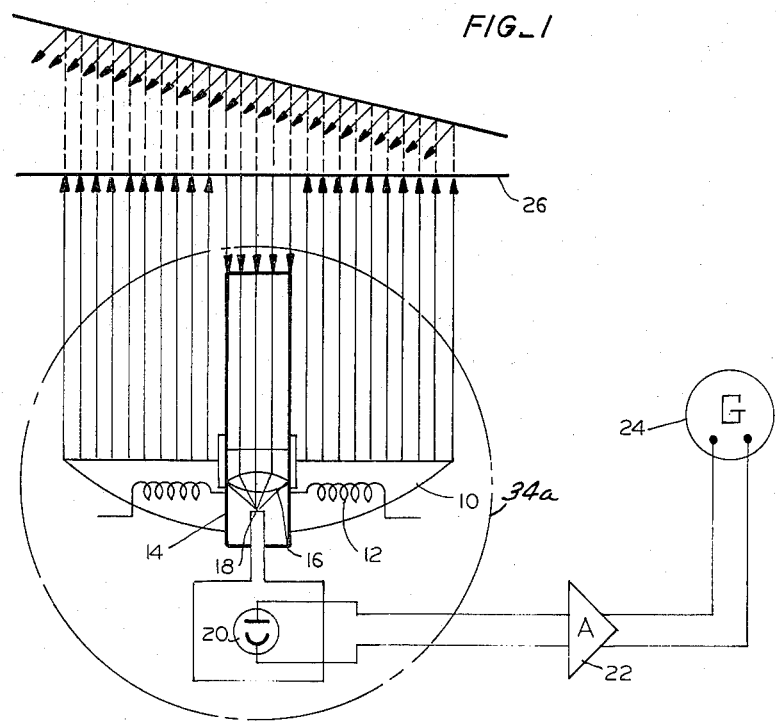
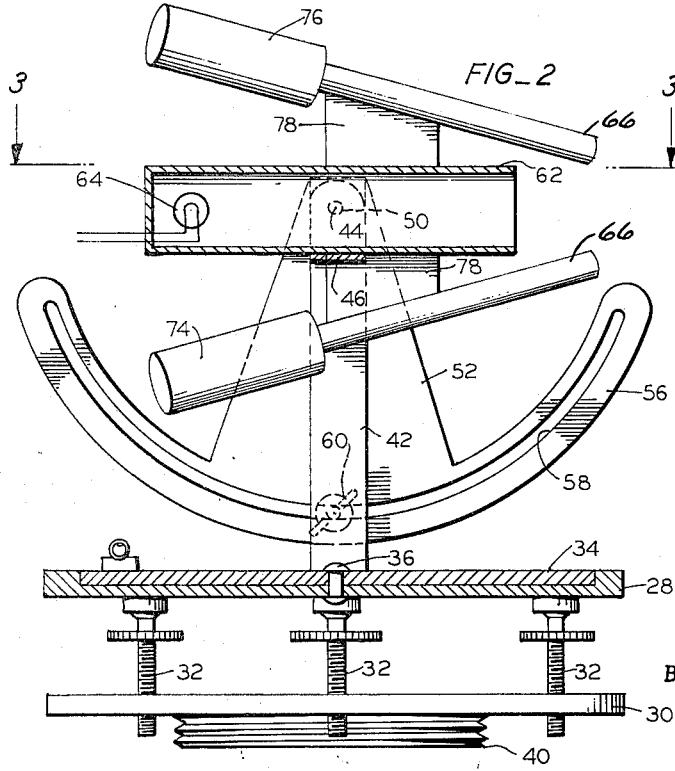
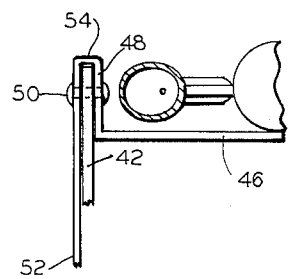
INVENTOR.
WALTER A. ORLOFF
BY Naylor + Neal
ATTORNEYS March 1, 1966 W. A. ORLOFF 3,238,373
PHOTOMETRIC GAGE FOR FINDING PERPENDICULARS TO SURFACES
Filed Sept. 26, 1962 2 Sheets-Sheet 2
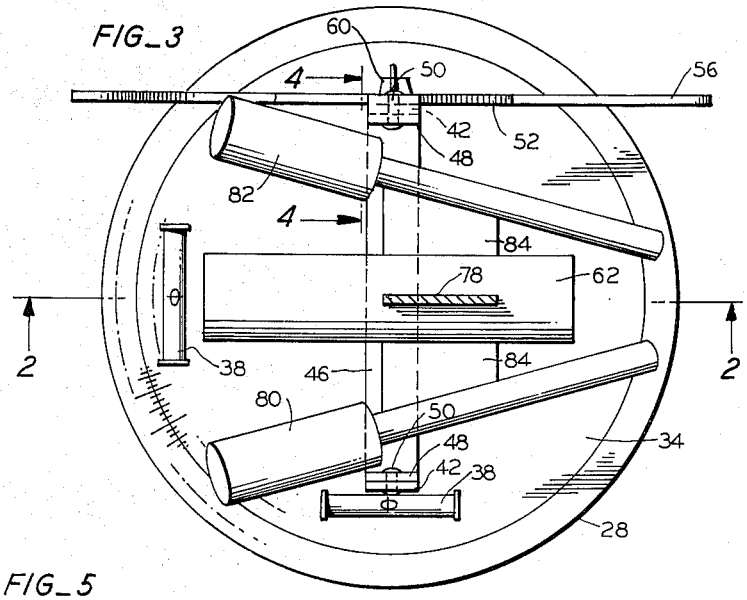
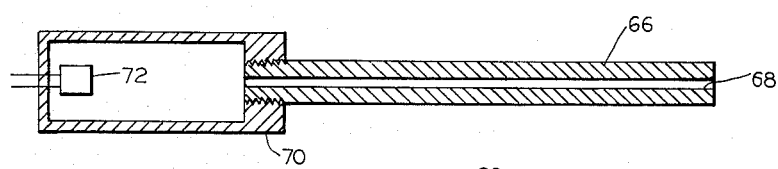
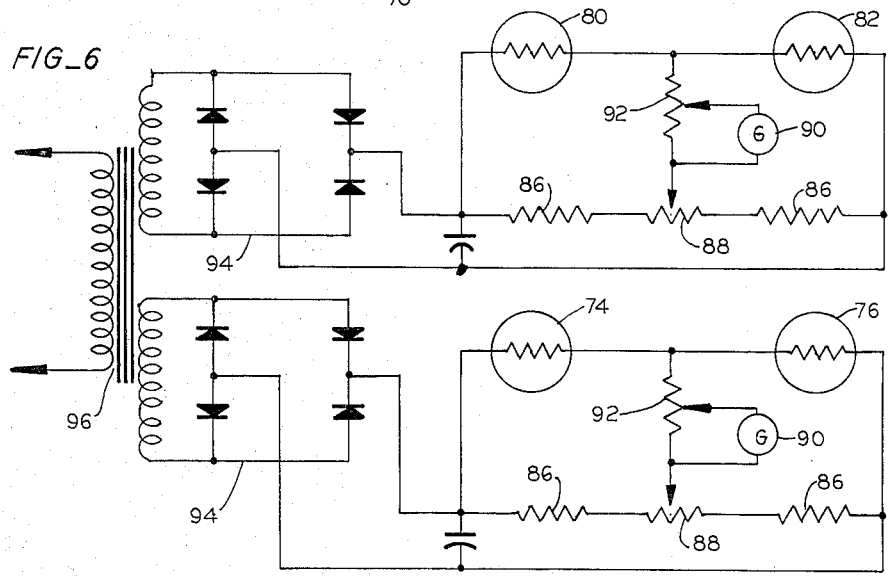
INVENTOR.
WALTER A. ORLOFF
BY
*Naylor + Neal*
ATTORNEYS

United States Patent Office 3,238,373
Patented Mar. 1, 1966

3,238,373
PHOTOMETRIC GAGE FOR FINDING PERPENDICULARS TO SURFACES
Walter A. Orloff, San Francisco, Calif., assignor of one-fourth each to Cyril N. Volk, San Francisco, Calif., and Henry J. Console and Edward E. Console, both of Watsonville, Calif.
Filed Sept. 26, 1962, Ser. No. 226,330
9 Claims. (Cl. 250—216)

This invention relates to measuring apparatus and more particularly to apparatus for finding a perpendicular to a surface which reflects light.

It is an object of this invention to provide apparatus for finding perpendiculars to surfaces which reflect light and for indicating the perpendicularity of such apparatus to such surfaces so that the apparatus may be employed for controlling angular alignment of equipment parts and the like and for measuring the perpendicularity of building walls and the like to proposed structures.

It is another object of the invention to provide such apparatus which may be constructed relatively easily and economically while providing a high degree of angular accuracy in locating perpendiculars.

It is another object of the invention to provide such apparatus which can operate efficiently in finding perpendiculars both to optically flat surfaces and to surfaces which are relatively rough and have random surface imperfections thereon.

It is another object of the invention to provide such apparatus which will indicate clearly and precisely the exact perpendicular alignment with a reflecting surface and which will indicate clearly and quantitatively its misalignment with the surface over a wide range.

It is another object of the invention to provide such apparatus with which perpendicular alignment can be ascertained in two planes perpendicular to the reflecting surface where alignment in each of the two planes can be established sequentially without disturbing alignment in the other plane.

Other objects and advantages of the invention will become apparent from the following description read in conjunction with the attached drawings in which:

FIG. 1 is a plan view of one form of apparatus of this invention and illustrating schematically the mounting means which is illustrated in greater detail in FIGS. 2 and 3;

FIG. 2 is a view in elevation taken along a central plane of another form of apparatus of this invention;

FIG. 3 is a plan view, partially broken away, of the apparatus of FIG. 2;

FIG. 4 is a sectional view of a portion of the apparatus of FIGS. 2 and 3 taken along the plane indicated at 4—4 in FIGS. 2 and 3;

FIG. 5 is a longitudinal sectional view of one of the detector assemblies in the apparatus of FIGS. 2–4, and FIG. 6 is a wiring diagram of the electrical output means in the apparatus of FIGS. 2–5.

Referring now in detail to FIG. 1, the form of apparatus shown therein includes a parabolic reflector 10 with a light filament, indicated schematically at 12, mounted adjacent to its focus, and with an aperture provided centrally of the reflector 10 with an opaque cylinder 14 mounted therein. A collimator lens 16 is mounted in the cylinder 14 for collecting parallel light rays traveling down the cylinder and focusing them on an aperture 18 through which they shine onto a photocell 20. The photocell is connected through an amplifier 22 to a galvanometer 24.

As indicated in FIG. 1, the cylinder 14 is mounted along the axis of the parabolic reflector 10 so that the filament 12 cannot be mounted precisely at the focus of the reflector. The filament 12 is mounted close to the focus so that the light rays emanating from the reflector 10 extend substantially parallel to the reflector's axis, and preferably the light rays are slightly convergent as they move away from the reflector so that they illuminate the complete area of a reflecting surface 26 both in front of the cylinder 14 and around it. The light rays are reflected from the surface 26 back into the cylinder 14 and are collected by the lens 16 to energize the photocell 20. As the angularity of the reflecting surface 26 is adjusted with respect to the axis of the cylinder 14, the signal indicated on the galvanometer 24 will peak when the axis of the cylinder 14 is perpendicular to the surface 26. The light source, reflector and photocell of the apparatus of FIG. 1 are mounted together as a single unit on a turntable provided with an azimuth scale indicated schematically at 34a in FIG. 1. The turntable and azimuth support of FIG. 1 are identical to the similar supports of FIGS. 2 and 3 with the cylinder 14 of FIG. 1 mounted in place of the cylinder 62 in FIG. 2.

In the form of apparatus of the invention illustrated in FIGS. 2–6 a base 28 is mounted on a frame 30 by adjusting screws 32, and a turntable 34 is mounted on the base 28 for rotation about a central vertical axis through a pivot pin 36. A pair of perpendicular level glasses 38 are mounted on the turntable 34 to facilitate leveling of the base 28 and turntable 34 by manipulation of the mounting screws 32. The underside of the frame 30 is provided with a threaded cylinder 40 for facilitating the mounting of the frame 30 on a surveyor's tripod or other equipment.

A frame 42 is mounted on turntable 34 for rotation therewith, and a yoke is mounted on the frame 42 for rotation about a horizontal axis 44 which is perpendicular to and intersects the axis of rotation of the turntable 34. As can be seen in FIGS. 2–4, the yoke includes a horizontal portion 46 extending across the turntable and having up-turned flanges 48 on its ends through which pivot pins 50 extend with the pivot pins received in apertures on the frame 42 for supporting the yoke for pivotal movement about the axis 44. At one side of the yoke, a plate 52 is rigidly attached to one of the flanges 48 by an integral bend 54 which extends across the top of one of the frame members 42 (see FIG. 4), and the plate 52 carries an arc 56 at its lower end. An arcuate slot 58 is provided in the arc 56 and receives a clamp screw 60 by which the arc 56 may be clamped to one of the frame members 42 in a plurality of positions of angular adjustment with respect thereto. The arc 56 is provided with angular graduations thereon which cooperate with an index on the frame 42 to indicate angles of elevation, and peripheral graduations are provided on the base 28 and turntable 34 for indicating horizontal angles.

Illuminating means consisting of a cylinder 62 containing a light source 64, are mounted on the cross bar 46 of the movable yoke with the axis of the cylinder 62 extending through the point of intersection of the horizontal axis 44 and the vertical axis of rotation of the turntable 34. A collimating lens may be mounted in the cylinder 62, but the beam of light generated by the light source 64 along the axis of the cylinder 62 need not necessarily be a beam of parallel light rays.

As indicated in FIGS. 2 and 3, two pairs of photosensitive detection means are mounted on the illuminating means in fixed space relation therewith for movement with the illuminating means as the yoke 46 is moved. Each pair of detection means includes two of the detectors which are shown in detail in FIG. 5. Each detector comprises an elongated tube 66 with an elongated cylindrical hole 68 extending therethrough. The length of the hole 68 should be substantially greater than its diameter and preferably at least 50 times its diameter. A cap 70 is mounted on one end of the tube 66 and contains a photoresistor 72 which is positioned to detect light passing through the hole 68 in the tube 66. As shown in FIG. 2, a pair of these detectors 74 and 76 are mounted on the cylinder 62 in a vertical plane through the axis of cylinder 62 by mounting webs 78, with the axes of the holes 68 in the detectors 74 and 76 being inclined to the axes of the cylinder 62 symmetrically on opposite sides thereof. As shown in FIG. 3, a similar pair of detectors 80 and 82 are mounted on the cylinder 62 in a horizontal plane through the axis of cylinder 62 by mounting webs 84 with the axes of the holes 68 in the detectors 80 and 82 being inclined to the axis of the cylinder 62 symmetrically on opposite sides thereof.

The apparatus of FIGS. 2-5 is employed to find the perpendicular to a light reflecting surface by mounting the apparatus adjacent to the light reflecting surface and projecting the light beam from the light source 64 onto the light reflecting surface. With the apparatus so mounted, the turntable 34 may be rotated until the detectors 80 and 82 detect reflected light of equal intensity, and the arc 56 may then be moved with respect to the frame 42 until the detectors 74 and 76 detect light of equal intensity at which point the illuminating axis of cylinder 62 will be perpendicular to the surface on which the light shines. A preferred means for comparing the light intensities detected by the detectors of the two pairs is shown in FIG. 6 and includes a pair of Wheatstone bridge circuits which incorporate standard resistors 86 and the photoresistors 72 of the detectors 74, 76, 80 and 82. Each of the Wheatstone bridge circuits is provided with a variable resistor 88 which may be adjusted at the time of manufacture of the unit to compensate for differences between the other resistors in the circuit, and each of the circuits includes an output galvanometer 90 connected across the bridge of the circuit and connected to a variable resistor 92 which may be adjusted during use of the unit to adjust its sensitivity. Suitable direct current power supplies are provided for the two Wheatstone bridge circuits such as the bridge rectifiers 94 and transformer 96 shown in FIG. 6.

While certain specific details of this invention have been illustrated and described in detail above, it is obvious that many modifications thereof may be made without departing from the spirit and scope of the invention.

I claim:

1. A surveying instrument for finding a perpendicular to a surface which reflects light which comprises: illuminating means having an illuminating axis and a light source for generating a beam of light parallel to such illuminating axis, detection means having a detection axis for detecting light rays which are substantially parallel to said detection axis, support means for said detection means and said illuminating means mounting said means in spaced relation to each other for joint movement with respect to a light reflecting surface with their illumination and detection axes facing in the same direction, output means connected to said detection means for indicating the intensity of light detected by said detection means, and said support means for said illuminating means and said detection means comprising a frame connecting said illuminating means and said detection means together, a graduated turntable connected to said frame for rotating said frame about a turntable axis perpendicular to said illuminating axis, and a graduated azimuth frame interconnecting said turntable and said frame for rotating said frame about an azimuth axis which is perpendicular to both said turntable axis and said illuminating axis with said azimuth axis, said turntable axis and said illuminating axis intersecting at the same point.

2. The apparatus of claim 1 in which said detection means comprises a cylindrical tube coaxial with said detection axis mounted in fixed space relation with respect to said illumination axis, and a photosensitive electrical detector mounted in said tube coaxial therewith.

3. The apparatus of claim 1 in which said illumination means comprises a parabolic reflector and a light source mounted adjacent to the focus of said reflector, and said detection means comprises an opaque cylindrical tube mounted coaxially with said parabolic reflector and having one end thereof facing away from said reflector and light source and having a photosensitive electrical detector mounted at its other end coaxially thereof to detect light only through said tube.

4. A surveying instrument for finding a perpendicular to a surface which reflects light which comprises: a frame, illuminating means having an illuminating axis and a light source on said illuminating axis for generating a beam of light along said illuminating axis, a graduated turntable mounting said illuminating means on said frame for rotation about a rotational axis which is perpendicular to said illuminating axis, a pair of photosensitive detection means mounted on said illuminating means for rotation with said illuminating means about said rotational axis with said pair of detection means mounted in the plane of said illuminative axis perpendicular to said rotational axis said positioned symmetrically on opposite sides of said illuminating axis for detecting said beam of light in said plane reflected in a pair of directions inclined symmetrically to said illuminating axis, output means connected to both of said detection means for indicating the comparative intensities of light detected by said pair of detection means, and a graduated azimuth frame interconnecting said turntable and said illuminating means for rotating said illuminating means and said detection means about an azimuth axis which is perpendicular to said rotational axis and said illuminating axis and intersects said rotational and illuminating axes at the same point.

5. The apparatus of claim 4 characterized further by the inclusion of a pair of cylindrical tubes mounted on said illuminating means with their axes positioned symmetrically on opposite sides of said illuminating axis and in said plane with each of said tubes having an open end facing in the direction in which said beam is generated by said illuminating means and a closed end with one of said photosensitive detection means mounted adjacent to the closed end of each of said tubes to detect light only through said tube.

6. A surveying instrument for finding a perpendicular to a surface which reflects light which comprises: a frame illuminating means having an illuminating axis and a light source on said illuminating axis for generating a beam of light along said illuminating axis, means mounting said illuminating means on said frame for independent rotation about two axes of rotation which are perpendicular to each other and are both perpendicular to said illumination axis and intersect each other at said illuminating axis, and a pair of detection means each mounted on said illumination means for movement with said illuminating means about one of said axes of rotation with each of said detection means having photosensitive electrical means for detecting said beam of light reflected in a plane through said one of said axes of rotation and output means connected to each of said detection means for indicating a parameter of the intensity of light detected by said detection means.

7. The apparatus of claim 6 in which each of said detection means of said pair comprises a pair of photosensitive electrical means mounted on opposite sides of said illuminating axis for detecting said beam of light in said plane reflected in a direction inclined to said illuminating axis, and said output means for each of said detection means comprises comparison means connected to both of said photosensitive means of one of said detection means for indicating the comparative intensities of light detected by said pair of photosensitive means.

8. The apparatus of claim 7 characterized further in that each of said detection means of said pair comprises a pair of cylindrical tubes mounted symmetrically on opposite sides of said illuminating means with their axes lying in said plane and with each of said tubes having an open end facing generally in the direction in which said beam is generated by said illuminating means and a closed end with one of said photosensitive means of said pair mounted adjacent to said closed end for detecting light only through said tube.

9. A surveying instrument for finding a perpendicular to a surface which reflects light which comprises a base, a graduated turntable mounted on said base for rotation about a central vertical rotational axis, a frame mounted on said turntable for rotation therewith, a graduated yoke mounted on said frame for rotation about a horizontal axis which is perpendicular to and intersects said vertical axis, a light source mounted on said yoke for generating a beam of light along an illumination axis which is perpendicular to and intersects said vertical and horizontal axes, two pairs of photosensitive detection means mounted on said yoke in fixed space relation with respect to said light source with one pair of said detection means mounted in a vertical plane through said illumination axis and positioned symmetrically on opposite sides of said illumination axis for detecting said beam of light reflected in a pair of directions in said plane symmetrically inclined to said illumination axis and with the other pair of said detection means mounted in a horizonal plane through said illumination axis and positioned symmetrically on opposite sides of said illumination axis for detecting said beam of light reflected in a pair of directions in said horizontal plane symmetrically inclined to said illumination axis a cylindrical tube surrounding each of said detection means with a closed end adjacent to said detection means, an open end remote from said detection means and facing in the direction in which said illuminating means faces, and a cylinder axis lying in said plane in which said detection means is mounted, and independent output means connected to said pairs of detection means for indicating the comparative intensities of light detected by the detection means of each pair.

References Cited by the Examiner

UNITED STATES PATENTS

| | | | |
|---|---|---|---|
| 2,331,144 | 10/1943 | Sitter | 250—215 X |
| 2,378,744 | 6/1945 | Annen | 250—215 X |
| 2,966,591 | 12/1960 | McCartney | 250—203 |
| 3,002,097 | 9/1961 | Nuut | 250—203 |

RALPH G. NILSON, *Primary Examiner.*

WALTER STOLWEIN, *Examiner.*